US012260350B2

(12) United States Patent
Qian et al.

(10) Patent No.: US 12,260,350 B2
(45) Date of Patent: Mar. 25, 2025

(54) METHOD FOR CONSTRUCTING TARGET PREDICTION MODEL IN MULTICENTER SMALL SAMPLE SCENARIO AND PREDICTION METHOD (71) Applicant: JIANGNAN UNIVERSITY, Wuxi (CN)

(72) Inventors: Pengjiang Qian, Wuxi (CN); Zhihuang Wang, Wuxi (CN); Shitong Wang, Wuxi (CN); Yizhang Jiang, Wuxi (CN); Wei Fang, Wuxi (CN); Chao Fan, Wuxi (CN); Jian Yao, Wuxi (CN); Xin Zhang, Wuxi (CN); Aiguo Chen, Wuxi (CN); Yi Gu, Wuxi (CN)

(73) Assignee: JIANGNAN UNIVERSITY, Jiangsu (CN)

( * ) Notice: Subject to any disclaimer, the term of this patent is extended or adjusted under 35 U.S.C. 154(b) by 0 days.

(21) Appl. No.: 18/412,519

(22) Filed: Jan. 13, 2024

(65) Prior Publication Data
US 2025/0013898 A1   Jan. 9, 2025

Related U.S. Application Data (63) Continuation of application No. PCT/CN2023/116931, filed on Sep. 5, 2023.

(30) Foreign Application Priority Data

Jul. 4, 2023 (CN) .......................... 202310807852.0

(51) Int. Cl.
G06N 5/04 (2023.01)
G06N 5/048 (2023.01)
(52) U.S. Cl.
CPC .................. G06N 5/048 (2013.01)

(58) Field of Classification Search
CPC ...................................................... G06N 5/048
See application file for complete search history.

(56) References Cited

U.S. PATENT DOCUMENTS

2002/0128989 A1  9/2002  Thess
2023/0162496 A1  5/2023  Basu et al.

FOREIGN PATENT DOCUMENTS

CN    108846512 A    11/2018
CN    110298382 A    10/2019
(Continued)

OTHER PUBLICATIONS

Shi et al.("FCM-RDpA: TSK fuzzy regression model construction using fuzzy C-means clustering, regularization, Droprule, and Powerball Adabelief" 2021) (Year: 2021).*
(Continued)

Primary Examiner — Lut Wong
(74) Attorney, Agent, or Firm — SZDC Law PC (57) ABSTRACT The invention provides a method for constructing a target prediction model in a multicenter small sample scenario and a prediction method. In combination with the idea of transfer learning, a training set of a new node is predicted by directly using knowledge of a trained node, and a prediction error sample is used to reflect a difference between the new node and the trained node. The difference is used as supplementary knowledge. Model knowledge of the new node is quickly acquired, to avoid training of a new node from scratch each time. Finally, parallel integration of incremental subclassifiers is implemented by using a ridge regression method, so that the deployment time and costs are greatly reduced. The generalization of models is ensured through sharing of historical knowledge and a knowledge discarding mechanism, good classification effect can also be achieved for a node with a small sample size.

7 Claims, 4 Drawing Sheets (56) References Cited

FOREIGN PATENT DOCUMENTS

| | | |
|---|---|---|
| CN | 111738323 A | 10/2020 |
| CN | 112949895 A | 6/2021 |
| CN | 113988418 A | 1/2022 |
| CN | 114298082 A | 4/2022 |
| CN | 114490985 A | 5/2022 |
| CN | 115186731 A | 10/2022 |
| CN | 115186798 A | 10/2022 |
| CN | 116596161 A | 8/2023 |
| JP | 2023011313 A | 1/2023 |
| WO | 2023077821 A1 | 5/2023 |

OTHER PUBLICATIONS

Kim et al.("Reinforced Fuzzy Clustering-Based Ensemble Neural Networks" 2020) (Year: 2020).*

* cited by examiner

METHOD FOR CONSTRUCTING TARGET PREDICTION MODEL IN MULTICENTER SMALL SAMPLE SCENARIO AND PREDICTION METHOD

This application is a Continuation Application of PCT/CN2023/116931, filed on Sep. 5, 2023, which claims priority to Chinese Patent Application No. 202310807852.0, filed on Jul. 4, 2023, which is incorporated by reference for all purposes as if fully set forth herein.

FIELD OF THE INVENTION

The present invention relates to the field of computer technologies, and in particular, to a method for constructing a target prediction model in a multicenter small sample scenario and a prediction method.

DESCRIPTION OF THE RELATED ART

With the increase in computing power of computers and the advent of big data era, machine learning becomes a powerful tool in data analysis, and makes outstanding contribution to the improvement of people's living standards. However, due to the privacy of data, there are data barriers between different organizations and departments, and as a result it is difficult to implement sharing of massive amount of data, making the deployment and joint training of multicenter data a difficult problem. For this, Google proposed a federated learning technology. Respective data is stored and trained in local phases, and only model updates are exchanged with a central server, so that the privacy and security of users are effectively guaranteed. At present, there are already many algorithms in the field. However, most of the algorithms are proposed based on a deep learning network. A current deep learning method has numerous parameters, a big model, a high data leakage risk, and difficult deployment. While classification accuracy has been quite optimal, most models are "black box models", which lack semantic interpretability, cannot meet security requirements in high risk fields, and are not applicable to organizations that require high security and interpretability. Conventional machine learning algorithms such as a k-nearest neighbor (KNN) algorithm, a support vector machine (SVM), a naive Bayes (NB) algorithm, linear discriminant analysis (LDA), a classification and regression tree (CART), and the like also tend to have a low accuracy rate for multicenter data due to data drifts and a small sample problem, produce less desired classification effect than deep learning, and also cannot ensure the privacy of multicenter data.

SUMMARY OF THE INVENTION

To resolve the foregoing technical problems, the present invention provides a method for constructing a target prediction model in a multicenter small sample scenario and a prediction method.

A method for constructing a target prediction model in a multicenter small sample scenario includes the following steps:
  S1: inputting a feature of a training sample into a multicenter training data set with m data centers, and predicting the training sample separately by using a plurality of subclassifiers and a historical knowledge classifier, where the historical knowledge classifier is a classifier that integrates rules of all the subclassifiers; and there are a total of m+1 dimensions after all prediction results are integrated, each dimension represents a prediction result of one classifier, a prediction result greater than 0 is determined as a positive class, and a prediction result less than 0 is determined as a negative class;
  S2: normalizing a prediction result vector into [−1, 1];
  S3: training a weight of each subclassifier using a ridge regression method by using a normalized prediction vector as a prediction feature and combining a training label corresponding to the training sample;
  S4: obtaining a comprehensive prediction result by combining the prediction vector and a weight of a classifier obtained through training; and
  S5: classifying the comprehensive prediction result to obtain a result same as the training label.

Preferably, an object function of performing weight training and a formula for solving a weight parameter are respectively:

$$J = \frac{1}{2}\|PW - Y\|_2^2 + \frac{1}{2}\lambda\|W\|_2^2,$$

and $$P_g = (\lambda I + P^T P)^{-1} P^T Y,$$

where P is the prediction vector, W is a weight vector of a subclassifier that requires training, Y is a true value label of a corresponding training sample, $\lambda$ is a regularization parameter of a structural risk item, $P_g$ is a consequence parameter calculated by using the ridge regression method, and I is an identity matrix.

Preferably, training of a first subclassifier includes a basic phase and a learning phase.

Preferably, the basic phase includes: acquiring initial fuzzy rule parameters c, $P_g$, and $\delta$ and information of error classification samples errors by using classic 0-order TSK, and using a Gaussian kernel function as a membership function, where c and $\delta$ are antecedent parameters, c is clustering centers obtained through fuzzy c-means (FCM) clustering of input data Data, and $\delta$ is a membership function kernel width obtained according to the input data Data, a membership degree matrix U of Data obtained through the FCM clustering to the clustering centers, and c.

Preferably, the learning phase includes: first performing the knowledge discarding on c and $P_g$, then performing knowledge summary to obtain an optimal knowledge group, and finally calculating the consequence knowledge of current fuzzy rules in combination with the input data Data, to obtain a prediction result.

Preferably, the knowledge discarding includes: first, determining a knowledge discarding ratio $r_1$ and a knowledge chaotization feature ratio $r_2$, randomly selecting, according to $r_1$, a rule that requires the knowledge discarding, and randomly selecting, according to $r_2$, a feature column lose_columns that requires knowledge chaotization; for each rule that requires the knowledge discarding, randomly determining that knowledge forgetting or the knowledge chaotization is required; directly setting c and $P_g$ to null for a rule that requires the knowledge forgetting; and for a rule that requires the knowledge chaotization, replacing a column lose_columns of the rule with a column value corresponding to another rule.

Preferably, the knowledge summary includes: using c and $P_g$ after discarding and the information of error classification samples errors together as candidate knowledge, and selecting the optimal knowledge group from the candidate knowledge as preparation knowledge of a current phase, where the information of error classification samples errors includes sample features and sample labels that separately correspond to c and $P_g$.

Preferably, the calculating the consequence knowledge of current fuzzy rules in combination with the input data Data, to obtain a prediction result specifically includes: calculating the membership function kernel width δ in combination with the input data Data and c in the preparation knowledge; and calculating the consequence knowledge corresponding to the current fuzzy rules by using the antecedent parameters c and δ and historical transfer knowledge of a corresponding consequence parameter, using the ridge regression method, and using an empirical risk item, a structural risk item, and a historical consequence parameter transfer knowledge regularization item as an object function, where an expression of the object function and a formula for solving a consequence parameter are respectively as follows:

$$J = \frac{1}{2}\|X_g P_g - Y\|_2^2 + \frac{1}{2}\lambda_1\|P_g\|_2^2 + \frac{1}{2}\lambda_2\|P_g - P_{g\_history}\|_2^2,$$

and $$P_g = ((\lambda_1 + \lambda_2)I + X_g^T X_g)^{-1}(X_g^T Y + \lambda_2 P_{g\_history}),$$

where $X_g$ is an input vector of the training sample after Gaussian kernel mapping, and $P_{g\text{-}history}$ is transfer knowledge of the historical consequence parameter.

Preferably, a fuzzy rule generated after training of each subclassifier is updated and added to a historical fuzzy rule base, to facilitate continued use for a subsequent subclassifier.

A target prediction method in a multicenter small sample scenario includes the following steps:

S1: constructing a prediction model by using the above-mentioned method for constructing a target prediction model in a multicenter small sample scenario;

S2: inputting, into the prediction model, a feature that is in a current target and corresponds to a feature of a training sample; and S3: obtaining, by the prediction model, a prediction result of the current target according to the feature.

Compared with the prior art, the foregoing technical solution of the present invention has the following advantages:

1. In the method for constructing a target prediction model in a multicenter small sample scenario in the present invention, in combination with the idea of transfer learning, a training set of a new node is predicted by directly using knowledge of a trained node, and a prediction error sample is used to reflect a difference between the new node and the trained node. The difference is used as supplementary knowledge. In this way, model knowledge of the new node is quickly acquired, to avoid training of a new node from scratch each time. Finally, parallel integration of incremental subclassifiers can be implemented by using a ridge regression method, so that the deployment time and costs are greatly reduced.

2. In the method for constructing a target prediction model in a multicenter small sample scenario in the present invention, the generalization of models is ensured through sharing of historical knowledge and a knowledge discarding mechanism, and with the support of sufficient shared knowledge, good classification effect can also be achieved for a node with a small sample size.

3. In the method for constructing a target prediction model in a multicenter small sample scenario, an improvement is made based on a zero-order TSK fuzzy system having high interpretability, and all model parameters may be reflected in a rule form, and therefore have high semantic transparency and can better assist a user in analyzing and understanding data during actual application.

4. In the present invention, the method for constructing a target prediction model in a multicenter small sample scenario adequately ensures that samples of different nodes are not leaked to each other, and better classification performance is manifested in experiments.

BRIEF DESCRIPTION OF THE DRAWINGS

To make the content of the present invention clearer and more comprehensible, the present invention is further described in detail below according to specific embodiments of the present invention and the accompanying drawings.

DETAILED DESCRIPTION OF THE PREFERRED EMBODIMENTS

The present invention is further described below with reference to the accompanying drawings and specific embodiments, to enable a person skilled in the art to better understand and implement the present invention. However, the embodiments are not used to limit the present invention.

Figure 1:
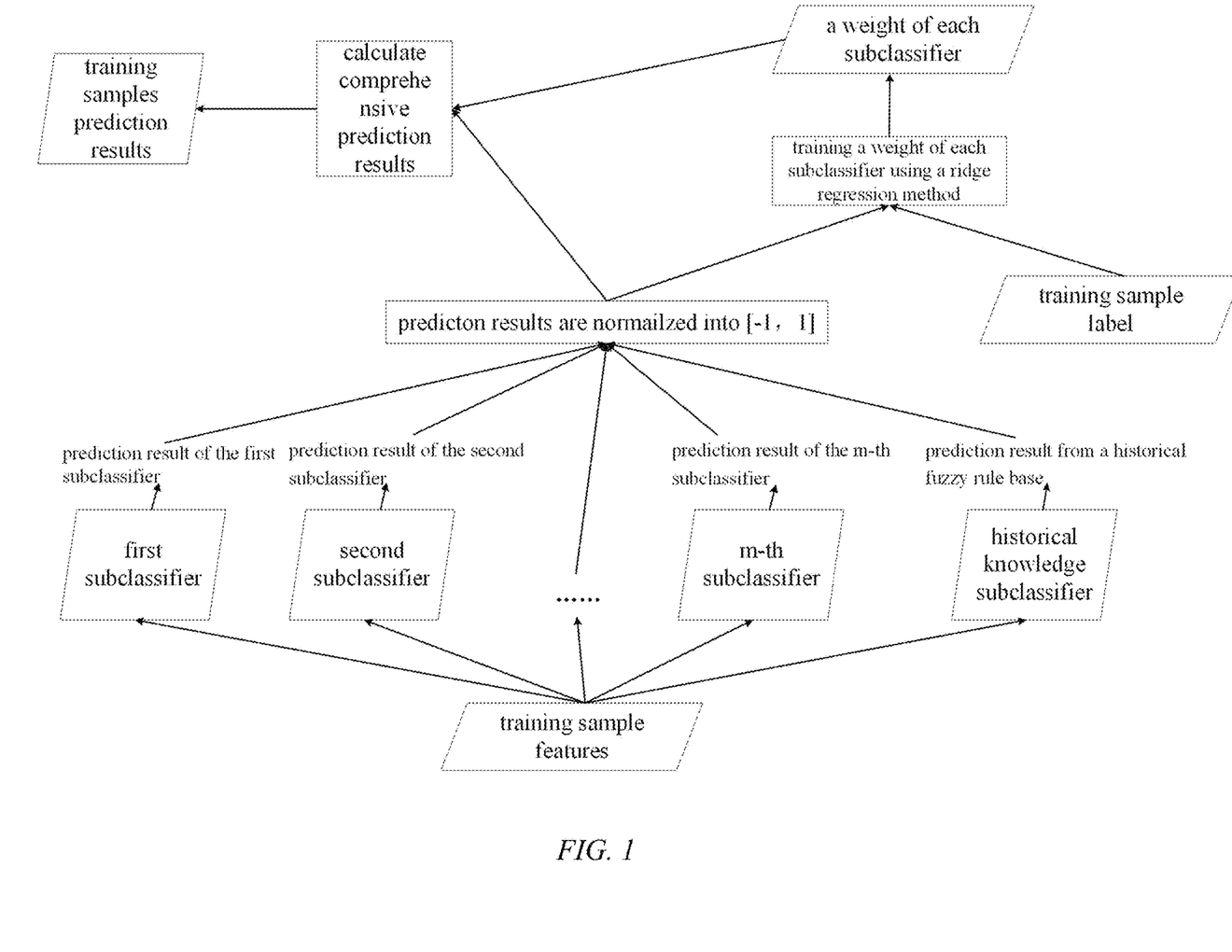
FIG. 1 shows an overall model architecture of a method for constructing a target prediction model in a multicenter small sample scenario according to the present invention.

As shown in FIG. 1, the present invention provides a method for constructing a target prediction model in a multicenter small sample scenario, including the following steps.

S1: Input a feature of a training sample into a multicenter training data set with m data centers, and predict the training sample separately by using a plurality of subclassifiers and a historical knowledge classifier, where the historical knowledge classifier is a classifier that integrates rules of all the subclassifiers; and there are a total of m+1 dimensions after all prediction results are integrated, each dimension represents a prediction result of one classifier, a prediction result greater than 0 is determined as a positive class, and a prediction result less than 0 is determined as a negative class.

S2: Normalize a prediction result vector into [−1, 1]. Such an operation can ensure a uniform dimension.

S3: Train an object function of weight of each subclassifier using a ridge regression method by using a normalized prediction vector as a prediction feature and combining a training label corresponding to the training sample. An object function of performing weight training and a formula for solving a weight parameter are respectively:

$$J = \frac{1}{2}\|PW - Y\|_2^2 + \frac{1}{2}\lambda\|W\|_2^2,$$

and $$P_g = (\lambda I + P^T P)^{-1} P^T Y,$$

where P is the prediction vector, W is a weight vector of a subclassifier that requires training, Y is a true value label of a corresponding training sample, λ is a regularization parameter of a structural risk item, $P_g$ is a consequence parameter calculated by using the ridge regression method, and I is an identity matrix. A solution of the weight W can be quickly obtained by using the above-mentioned formula and using the ridge regression method.

S4: Calculate a comprehensive prediction result by combining the prediction vector and a weight of a classifier obtained through training.

S5: Classify the prediction result. A prediction result greater than 0 is a positive class, and a prediction result less than 0 is a negative class.

Figure 2:
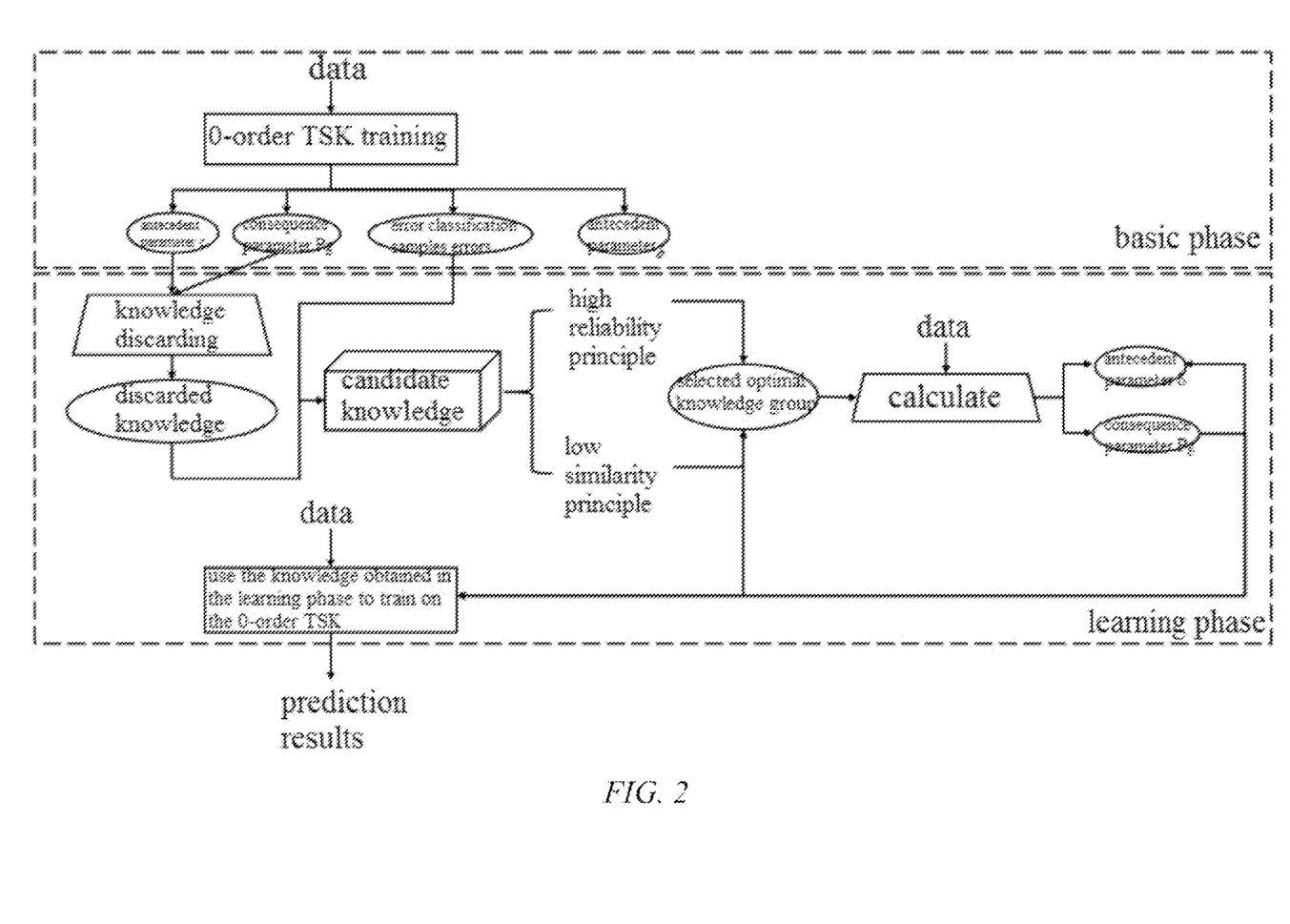
FIG. 2 shows training details of a first subclassifier of a method for constructing a target prediction model in a multicenter small sample scenario the present invention.

In a specific embodiment, a first subclassifier is used as a guarantee for quick training of a subsequent subclassifier. A data center with a relatively sufficient amount of data should be selected to train the first subclassifier. As shown in FIG. 2, training of the first subclassifier includes a basic phase and a learning phase.

In the basic phase, initial fuzzy rule parameter c, $P_g$, and δ and information of error classification samples errors are acquired by using a first-order form and a zero-order form of classic 0-order Takagi-Sugeno-Kang (TSK) fuzzy system. A Gaussian kernel function is used as a membership function. c and δ are antecedent parameters, c is clustering centers obtained through an FCM clustering algorithm of input data Data, and δ is a membership function kernel width obtained according to the input data Data, a membership degree matrix U of Data obtained through the FCM clustering to the clustering centers, and c.

The learning phase includes the following steps.

S1: First perform the knowledge discarding on c and $P_g$.
S2: Then perform knowledge summary to obtain an optimal knowledge group.
S3: Finally calculate the consequence knowledge of current fuzzy rules in combination with the input data Data, to obtain a prediction result.

In S1, a knowledge discarding mechanism simulates the forgetting characteristic of human brain, including knowledge forgetting and knowledge chaotization, which correspond to complete forgetting of knowledge and forgetting of partial features of knowledge. First, a knowledge discarding ratio $r_1$ and a knowledge chaotization feature ratio $r_2$ are determined, a rule that requires the knowledge discarding is randomly selected according to $r_1$, and a feature column lose_columns that requires knowledge chaotization is randomly selected according to $r_2$. For each rule that requires the knowledge discarding, it is randomly determined that knowledge forgetting or the knowledge chaotization is required. c and $P_g$ are directly set to null for a rule that requires the knowledge forgetting. For a rule that requires the knowledge chaotization, a column lose_columns of the rule is replaced with a column value corresponding to another rule, to achieve the effect of knowledge confusion.

In S2, c and $P_g$ after discarding and the information of error classification samples errors are used together as candidate knowledge, and the optimal knowledge group is selected from the candidate knowledge as preparation knowledge of a current phase, where the information of error classification samples errors includes sample features and sample labels that separately correspond to c and $P_g$. A distance calculated in the knowledge summary is a distance between the antecedent knowledge c and a center in a center set formed by feature columns of errors. The selection of knowledge follows two principles: high reliability and low similarity.

First, to measure a confidence level of a candidate center, a quantity of training samples in an adjacent domain of each candidate center needs to be calculated, and then the value is mapped to [0, 1]. When there are more training samples in the adjacent domain, the confidence level of the candidate center is higher. A radius of the adjacent domain is an average value obtained by averaging a sum of Euclidean distances between all candidate centers. In addition, a Euclidean distance between the candidate center and the closest center in a representative center set is calculated to estimate a degree of similarity between each candidate center and the representative center set, and an attempt is made to ensure that a degree of similarity between selected centers is low. Similarly, a similarity value also needs to be mapped to [0, 1]. A sum of indicators of reliability and similarity after mapping is calculated to reflect an importance level of each center. A final optimal center combination is selected according to this importance level, and finally these centers and consequence knowledge corresponding to these centers are used as the selected optimal knowledge group.

In S3, the membership function kernel width δ may be calculated in combination with the input data Data and c in the preparation knowledge. In this case, the consequence knowledge corresponding to the current fuzzy rule may be quickly calculated by using the antecedent parameters c and δ and historical transfer knowledge of a corresponding consequence parameter, using the ridge regression method, and using an empirical risk item, a structural risk item, and a historical consequence parameter transfer knowledge regularization item as an object function, where an expression of the object function and a formula for solving a consequence parameter are respectively as follows:

$$J = \frac{1}{2}\|X_g P_g - Y\|_2^2 + \frac{1}{2}\lambda_1\|P_g\|_2^2 + \frac{1}{2}\lambda_2\|P_g - P_{g\_history}\|_2^2,$$

and $$P_g = ((\lambda_1 + \lambda_2)I + X_g^T X_g)^{-1}(X_g^T Y + \lambda_2 P_{g\_history}),$$

where $X_g$ is an input vector of the training sample after Gaussian kernel mapping, and $P_{g\text{-}history}$ is transfer knowledge of the historical consequence parameter. In this way, further generalized learning of knowledge is implemented by using historical knowledge and error classification sample knowledge, to continuously obtain more robust new knowledge.

Figure 3:
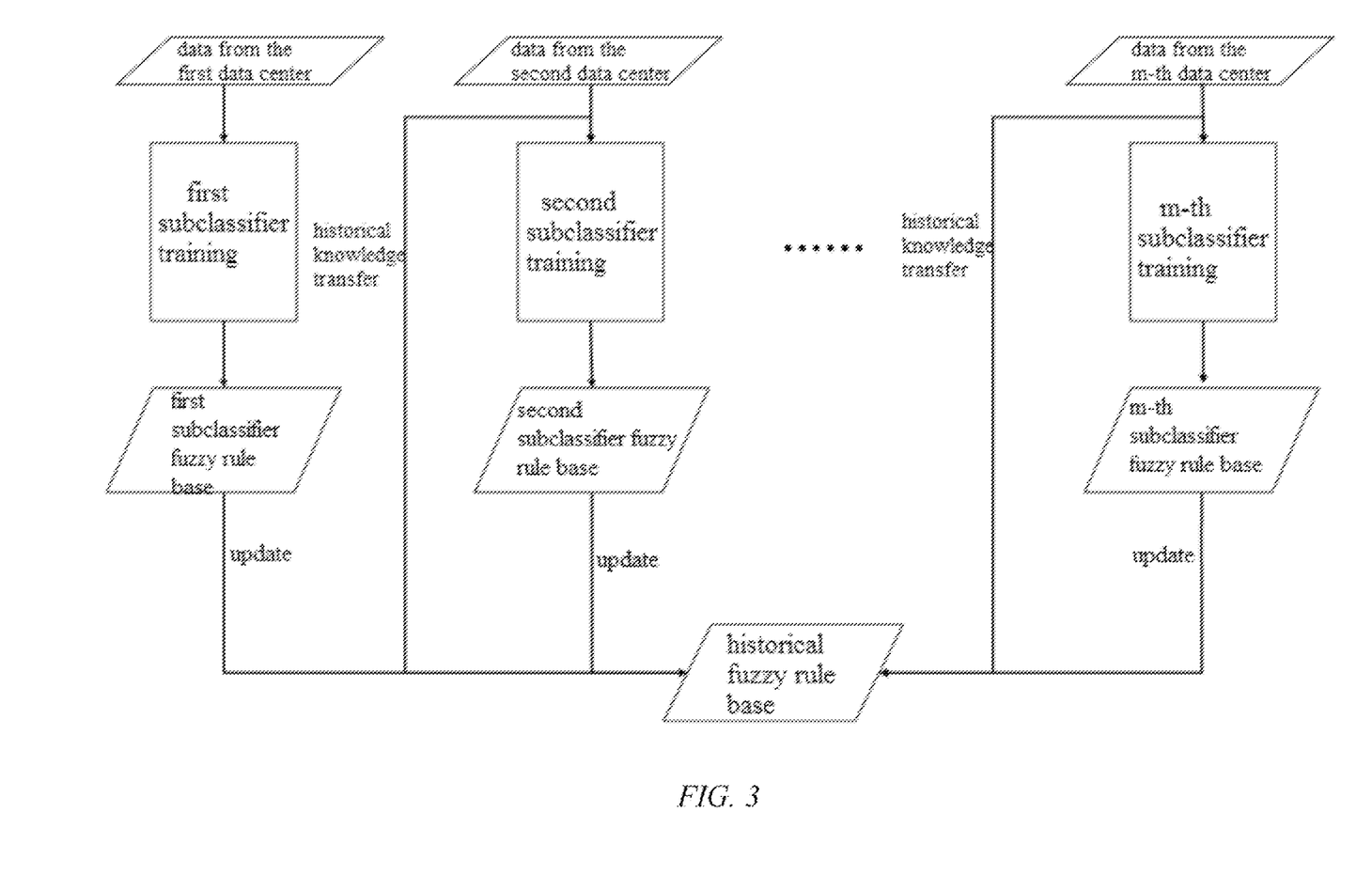
FIG. 3 shows a collaborative training process of subclassifiers of a method for constructing a target prediction model in a multicenter small sample scenario according to the present invention.

In a specific embodiment, a collaborative training process of a plurality of subclassifiers is shown in FIG. 3. A fuzzy rule generated after training of each subclassifier is updated and added to a historical fuzzy rule base, to facilitate continued use for a subsequent subclassifier. For a subclassifier other than the first subclassifier, training in the basic phase is no longer required, and instead knowledge of a current historical fuzzy rule base is directly used to predict data samples of a current center. After information of error classification samples errors is obtained, training in the learning phase may be performed like the first subclassifier, so that training time is greatly reduced, and historical knowledge is better used, to avoid that good knowledge cannot be obtained in a basic phase in a small sample scenario.

The present invention further provides a target prediction method in a multicenter small sample scenario includes the following steps.

S1: Construct a prediction model by using the above-mentioned method for constructing a target prediction model in a multicenter small sample scenario.

S2: Input, into the prediction model, a feature that is in a current target and corresponds to a feature of a training sample.

S3: Obtain, by the prediction model, a prediction result of the current target according to the feature.

The method for constructing a target prediction model in a multicenter small sample scenario and the prediction method in the present invention may be applied to scenarios such as traffic prediction, disease auxiliary diagnosis, and the like.

During traffic congestion, if enough traffic police is not dispatched in advance to guide traffic, traffic accidents and violations of traffic laws may occur, posing severe threat to the safety of people's life and property. Specifically, during traffic prediction, different cities are used as data centers. Traffic congestion time, congestion sites, and the like of the data centers vary due to various reasons but have similar trends. The cities separately collect traffic data of the cities in several years as training features to jointly use the method for constructing a target prediction model in a multicenter small sample scenario of this application to construct a congestion prediction model, to implement sharing of abstract and fuzzy rules without leaking traffic data of different data centers to other data centers. Each center may input current traffic data as features into the congestion prediction model, to obtain a prediction result of current congestion. Congestion feature trends of other centers are used for reference for the prediction result, so that it is determined more appropriately which periods are more prone to congestion peaks, to dispatch traffic police officers in time to go to direct traffic, thereby ensuring normal passage and driving safety of people.

In the medical field, doctors usually cannot provide a large amount of annotated data for training of artificial intelligence models, and in most cases can only obtain a small number of annotated samples. A prediction result obtained through small sample training is usually poor. For medical data of different hospitals, the data has different distributions due to districts or other reasons, but still has similar trends and is of great guiding significance for training of respective models. However, in consideration of the privacy of patients, medical data generally cannot be made public. Therefore, although a number of hospitals may have a large amount of data, such data cannot be shared with each other. In the method for constructing a target prediction model in a multicenter small sample scenario in this application, abstract and fuzzy rules of each hospital can be extracted. While the privacy of patients is ensured, each hospital can develop a more appropriate prediction model under the guidance of the fuzzy rules of other hospitals. The prediction model becomes auxiliary means for diagnosis by doctors, so that the workload of doctors is greatly reduced, treatment efficiency of the patients is improved, and data of different hospitals is fully utilized.

In this application, a data set personal-key-indicators-of-heart-disease (https://www.kaggle.com/datasets/kamilpyt-lak/personal-key-indicators-of-heart-disease) on the website Kaggle is used as an experimental data set. Because the original data set has an excessively large amount of data, to simulate a small sample node scenario of a multicenter data set, some samples are selected from the data set to carry out experiments. First, according to feature columns of different types in the data set, Europeans, Africans, and Asians are used as three centers to make a data set. A selected data sample has complete feature column information, and character feature columns are replaced with discrete numbers to facilitate subsequent calculation. Each finally selected sample includes 16 feature columns and 1 label column. In the experiments, a 4:1 ratio is used for division into a training set and a test set, and parameters are determined by using 5-fold cross validation. Data features are normalized, to map the features into a range of $[-1, 1]$. Specific division of the data set is recorded in the following table:

| | Training set (positive class) | Training set (negative class) | Test set (positive class) | Test set (negative class) |
|---|---|---|---|---|
| Europeans | 400 | 400 | 100 | 100 |
| Africans | 16 | 16 | 4 | 4 |
| Asians | 16 | 16 | 4 | 4 |
| Total | 432 | 432 | 108 | 108 |

The positive class represents sample data of patients with heart diseases, and the negative class represents sample data of patients with no heart diseases.

Figure 4:
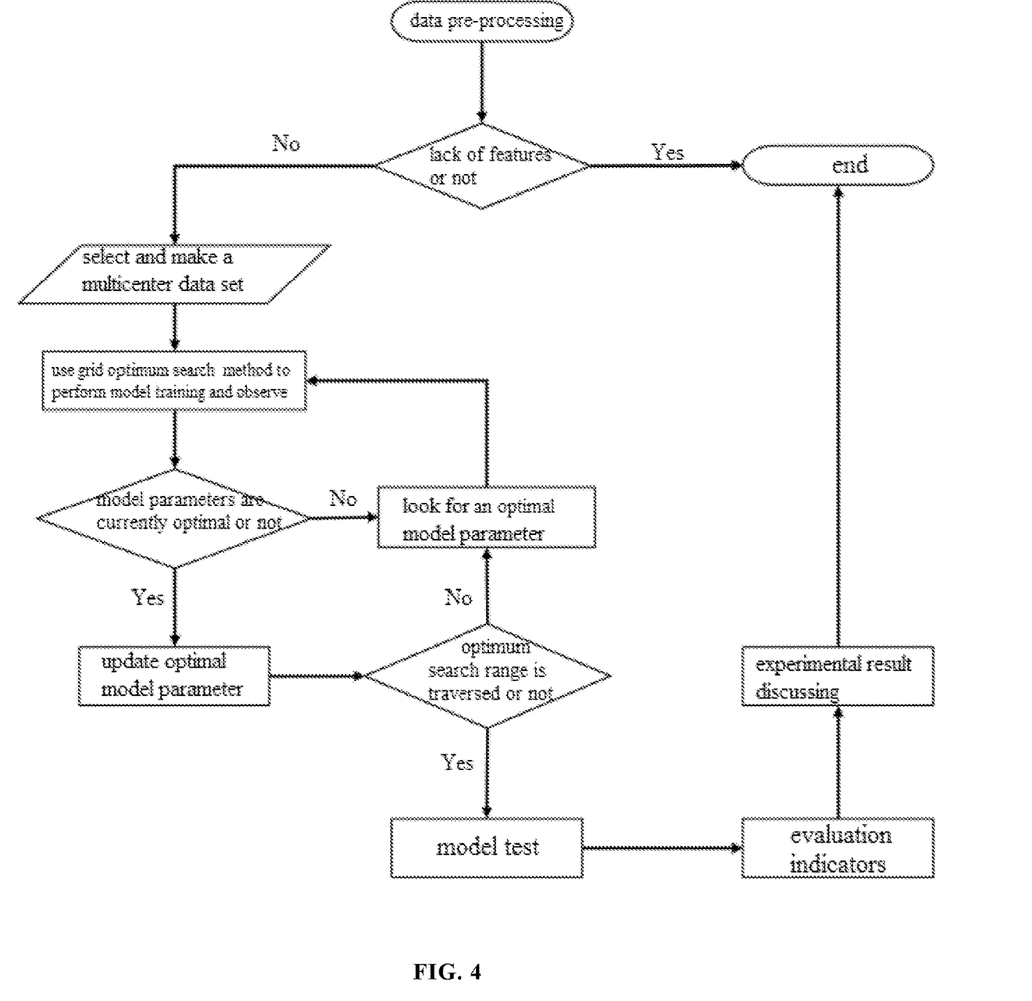
FIG. 4 is a flowchart of experiments of a method for constructing a target prediction model in a multicenter small sample scenario according to the present invention.

Specific experimental steps are shown in FIG. 4, and include the following steps.

S1: Data preprocessing. According to different types of people, samples with complete feature information are separately selected from the three centers Europeans, Africans, and Asians to make a data set, and character feature columns are replaced with discrete numbers to facilitate subsequent calculation. Each finally selected sample includes 16 feature columns and 1 label column. The label column is used for calculating a weight of each subclassifier or validating the accuracy of data predicted by using the method for constructing a target prediction model in a multicenter small sample scenario in this application. In the experiments, a 4:1 ratio is used for random division of each center into a training set and a test set. Data features are normalized, to map the features into a range of $[-1, 1]$.

S2: Make a multicenter data set. According to the processing data, the training set and the test set of each center are separately saved in a .mat format, and additionally training sets all centers and test sets of all the centers are also saved in a mat format, to facilitate final training of a weight of each subclassifier.

S3: Model training and parameter range adjustment. Because a network has errors of different effect for specific data sets. Therefore, grid optimum search is required, and is mainly used for a specific network to obtain optimal parameters for a specific data set. A 5-fold cross validation manner is used to search a parameter optimum search range for an optimal parameter, and a current optimal parameter is continuously updated until iteration ends, to obtain final optimal hyperparameters. In this process, model results are observed through repeated experiments. In combination with the performance of a model in the training set and the test set, it is determined whether the model reaches optimal fitting, to gradually determine an optimal optimum search range of a model parameter. In the above-mentioned data set, related parameters of the algorithm during optimum search are specifically as follows:

| Parameter | Value | Parameter | Value |
| --- | --- | --- | --- |
| Optimum search range of a clustering center number of a data center (a center 1 in this experiment) with a large amount of data | [5, 7, 9, 11, 13, 15] | Optimum search range of a regularization coefficient of a structural risk item of a consequence parameter | [0.001, 0.01, 0.1, 1, 10, 100, 1000] |
| Optimum search range of a clustering center number of a data center (a center 2 and a center 3 in this experiment) with a small amount of data | [2, 3, 4, 5] | Optimum search range of a regularization coefficient of a structural risk item of a subclassifier weight | [0.001, 0.01, 0.1, 1, 10, 100, 1000] |
| Optimum search range of a kernel width adjustment coefficient of a membership function | [0.001, 0.01, 0.1, 1, 10, 100, 1000] | Knowledge chaotization feature ratio | 0.1 |
| Optimum search range of a regularization coefficient of a knowledge transfer item of a historical consequence | [0.001, 0.01, 0.1, 1, 10, 100, 1000] | Knowledge discarding ratio | 0.1 |

S4: Perform training again. The optimal hyperparameters found through grid optimum search are used to perform model training again.

S5: Model test. A trained model is tested by using a test set, to observe whether a test result meet expectations.

S6: Evaluation indicators. A test result of a test set is obtained by using the above-mentioned steps. A plurality of evaluation indicators are calculated by using formulas. The evaluation indicators used in a current experiment are accuracy, precision, recall, F1 score, and area under curve (AUC).

In this embodiment, the method for constructing a target prediction model in a multicenter small sample scenario provided in this application is compared with existing classic conventional machine learning algorithms. The algorithms for comparison include: LDA, KNN, NB, a CART algorithm, an SVM, and a first-order form and a zero-order form of a TSK fuzzy system (TSK-FS). Mean values and variances of five classification and evaluation indicators (for ease of observation of results, 4 decimal places are kept for all results) in ten experiments of these algorithms are recorded in the following table:

An AUC is defined as an area under a ROC curve. The reason that an AUC value is usually used as an evaluation standard for a model is that most of the time the ROC curve cannot clearly indicate which classifier has better effect. As a value, a classifier with a larger corresponding AUC has better effect. As can be seen from the table, in the three indicators, namely, the accuracy, the precision, and the AUC, the method for constructing a target prediction model in a multicenter small sample scenario provided in this application has better performance than the other algorithms, and is also comparable with the other conventional algorithms in the recall and the F1 score. Therefore, as seen from the classification performance, the method for constructing a target prediction model in a multicenter small sample scenario provided in this application has better performance than other conventional algorithms.

In addition, in consideration of the interpretability of algorithms, the complexity comparison of three fuzzy system-based rules 1-TSK-FS, 0-TSK-FS, and the method for constructing a target prediction model in a multicenter small sample scenario provided in this application in the experiments is shown in the following table:

| | | Accuracy | Precision | Recall | F1 score | AUC |
| --- | --- | --- | --- | --- | --- | --- |
| LDA | Mean value | 0.6671 | 0.6672 | 0.6676 | 0.6674 | 0.7546 |
| | Variance | 0.0114 | 0.0149 | 0.0029 | 0.0082 | 0.0014 |
| KNN | Mean value | 0.6607 | 0.6805 | 0.6056 | 0.6408 | 0.7206 |
| | Variance | 0.0069 | 0.0058 | 0.0159 | 0.0105 | 0.0065 |
| CART | Mean value | 0.6806 | 0.6628 | 0.7361 | 0.6975 | 0.7265 |
| | Variance | 0.0146 | 0.0160 | 0.0049 | 0.0111 | 0.0124 |
| SVM | Mean value | 0.6824 | 0.6841 | 0.6787 | 0.6813 | 0.7534 |
| | Variance | 0.0088 | 0.0135 | 0.0045 | 0.0048 | 0.0058 |
| NB | Mean value | 0.6667 | 0.6765 | 0.6389 | 0.6571 | 0.7503 |
| | Variance | $1.1703e^{-16}$ | $1.1703e^{-16}$ | $1.1703e^{-16}$ | $1.1703e^{-16}$ | 0 |
| 1-TSK-FS | Mean value | 0.6704 | 0.6772 | 0.6565 | 0.6666 | 0.7471 |
| | Variance | 0.0053 | 0.0050 | 0.0102 | 0.0064 | 0.0019 |
| 0-TSK-FS | Mean value | 0.5602 | 0.3258 | 0.2685 | 0.2944 | 0.6961 |
| | Variance | 0.0683 | 0.3435 | 0.2830 | 0.3103 | 0.0019 |
| The application | Mean value | 0.6903 | 0.6912 | 0.6889 | 0.6897 | 0.7591 |
| | Variance | 0.0091 | 0.0131 | 0.0248 | 0.0111 | 0.0055 |

|  | Number of antecedent features | Number of consequence parameters | Average number of rules | Rule complexity |
|---|---|---|---|---|
| 0-TSK-FS | 16 | 1 | 6.5 | 214.5 |
| 1-TSK-FS | 16 | 16 | 18.5 | 888 |
| The present application, | 16 | 1 | 22.2 | 732.6 |

As can be seen from the foregoing table, although 0-TSK-FS has lower rule complexity than the method for constructing a target prediction model in a multicenter small sample scenario provided in this application, the classification performance of the method for constructing a target prediction model in a multicenter small sample scenario provided in this application is clearly far better 0-TSK-FS. The classification performance and the rule complexity of 1-TSK-FOURTH are both not as good as those of the method for constructing a target prediction model in a multicenter small sample scenario provided in this application. In summary, the classification performance and the interpretability of the method for constructing a target prediction model in a multicenter small sample scenario provided in this application are better than those of these conventional algorithms.

During formal training of a model, a parameter optimum search range of cross validation is continuously adjusted by observing a training result each time, to keep an excessively complex parameter model from causing overfitting, thereby improving the generalization capability of the model. After repeated training, a stable model with good performance is gradually established. During actual application, as long as some organizations have sufficient sample data, an organization with a small sample size can also quickly and effectively perform local deployment without violating data privacy of other organizations, and obtain a local model having good classification capability, generalization capability, and interpretability and put the local model into use, to assist a number of organizations in completing joint training more efficiently.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the invention of the present invention.

What is claimed is:

1. A method for constructing a target prediction model in a multicenter small sample scenario, comprising steps of:
S1: inputting a feature of a training sample into a multicenter training data set with m data centers, and predicting the training sample separately by using a plurality of subclassifiers and a historical knowledge classifier, wherein the historical knowledge classifier is a classifier that integrates rules of all the subclassifiers; and there are a total of m+1 dimensions after all prediction results are integrated, each dimension represents a prediction result of one classifier, a prediction result greater than 0 is determined as a positive class, and a prediction result less than 0 is determined as a negative class;
S2: normalizing a prediction result vector into [−1, 1];
S3: training a weight of each subclassifier using a ridge regression method by using a normalized prediction vector as a prediction feature and combining a training label corresponding to the training sample;
S4: obtaining a comprehensive prediction result by combining the prediction vector and the weight of the each subclassifier obtained through training; and
S5: classifying the comprehensive prediction result to obtain a result same as the training label,
wherein training of a first subclassifier comprises a basic phase and a learning phase; training of another subclassifier is based on training of the first subclassifier, and comprises the learning phase; the basic phase comprises: acquiring initial fuzzy rule parameters c, $P_g$, and δ and information of error classification samples errors by using classic 0-order Takagi-Sugeno-Kang (TSK), and using a Gaussian kernel function as a membership function, wherein c and δ are antecedent parameters, c is clustering centers obtained through fuzzy c-means (FCM) clustering of input data Data, and δ is a membership function kernel width obtained according to the input data Data, a membership degree matrix U of Data obtained through the FCM clustering for the clustering centers, and c; and the learning phase comprises: first performing knowledge discarding on c and $P_g$, wherein the knowledge discarding comprises: first, determining a knowledge discarding ratio $r_1$ and a knowledge chaotization feature ratio $r_2$, randomly selecting, according to $r_1$, a rule that requires the knowledge discarding, and randomly selecting, according to $r_2$, a feature column lose_columns that requires knowledge chaotization; for each rule that requires the knowledge discarding, randomly determining that knowledge forgetting or the knowledge chaotization is required; directly setting c and $P_g$ to null for a rule that requires the knowledge forgetting; and for a rule that requires the knowledge chaotization, replacing a column lose_columns of the rule with a column value corresponding to another rule.

2. The method for constructing a target prediction model in a multicenter small sample scenario according to claim 1, wherein an object function of performing weight training by using the ridge regression method and a formula for solving a weight parameter are respectively:

$$J = \frac{1}{2}\|PW - Y\|_2^2 + \frac{1}{2}\lambda\|W\|_2^2,$$

and $$P_g = (\lambda I + P^T P)^{-1} P^T Y,$$

wherein P is the prediction vector, W is a weight vector of a subclassifier that requires training, Y is a true value label of a corresponding training sample, λ is a regularization parameter of a structural risk item, $P_g$ is a consequence parameter calculated by using the ridge regression method, and I is an identity matrix.

3. The method for constructing a target prediction model in a multicenter small sample scenario according to claim 1, wherein the learning phase further comprises: performing knowledge summary on c and $P_g$ after the knowledge discarding is performed to obtain an optimal knowledge group, and finally calculating the consequence knowledge of current fuzzy rules in combination with the input data Data, to obtain a prediction result.

4. The method for constructing a target prediction model in a multicenter small sample scenario according to claim 3, wherein the knowledge summary comprises: using c and $P_g$ after discarding and the information of error classification samples errors together as candidate knowledge, and selecting the optimal knowledge group from the candidate knowledge as preparation knowledge of current phase, wherein the information of error classification samples errors comprises sample features and sample labels that separately correspond to c and $P_g$.

5. The method for constructing a target prediction model in a multicenter small sample scenario according to claim 4, wherein the calculating the consequence knowledge of current fuzzy rules in combination with the input data Data, to obtain a prediction result specifically comprises: calculating the membership function kernel width δ in combination with the input data Data and c in the preparation knowledge; and calculating the consequence knowledge corresponding to the current fuzzy rules by using the antecedent parameters c and δ and historical transfer knowledge of a corresponding consequence parameter, using the ridge regression method, and using an empirical risk item, a structural risk item, and a historical consequence parameter transfer knowledge regularization item as an object function, wherein an expression of the object function and a formula for solving a consequence parameter are respectively as follows:

$$J = \frac{1}{2}\|X_g P_g - Y\|_2^2 + \frac{1}{2}\lambda_1 \|P_g\|_2^2 + \frac{1}{2}\lambda_2 \|P_g - P_{g\_history}\|_2^2,$$

and $$P_g = ((\lambda_1 + \lambda_2)I + X_g^T X_g)^{-1}(X_g^T Y + \lambda_2 P_{g\_history}),$$

wherein $X_g$ is an input vector of the training sample after Gaussian kernel mapping, and $P_{g\text{-}history}$ is transfer knowledge of the historical consequence parameter.

6. The method for constructing a target prediction model in a multicenter small sample scenario according to claim 1, wherein a fuzzy rule generated after training of each subclassifier is updated and added to a historical fuzzy rule base, to facilitate continued use for a subsequent subclassifier.

7. A target prediction method in a multicenter small sample scenario, comprising of:
S1: constructing a prediction model by using the method for constructing a target prediction model in a multicenter small sample scenario according to claim 1;
S2: inputting, a feature in a current target corresponding to a feature of a training sample, into the prediction model; and
S3: obtaining, by the prediction model, a prediction result of the current target according to the feature.

* * * * *